UNITED STATES PATENT OFFICE.

RICHARD CLARKSON SCOTT, OF LIVERPOOL, COUNTY OF LANCASTER, ENGLAND.

EFFERVESCENT-BEVERAGE POWDER.

SPECIFICATION forming part of Letters Patent No. 369,368, dated September 6, 1887.

Application filed October 2, 1886. Serial No. 215,187. (No specimens.)

*To all whom it may concern:*

Be it known that I, RICHARD CLARKSON SCOTT, a subject of the Queen of Great Britain, residing at Liverpool, in the county of Lancaster, in the Kingdom of England, have invented certain new and useful Improvements in Compound for Making Drinks, of which the following is a specification.

This invention has for its object an effervescent drink to be sold in the pulverulent form, that shall have the advantages of forming a colored drink and froth from a white powder, (and thus appearing to have a peculiar chemical reaction,) and of being distinctly oxygenizing.

The invention consists in taking the usual constituents of effervescent drinks—a non-poisonous vegetable acid, such as tartaric or citric acid and an alkaline bicarbonate. These can either be mixed dry or kept separate, the carbonate in one paper or package, the acid in another, and adding to these an oxygenating compound, such as permanganate of potash or chlorate of potash. I prefer the former. It is preferably added in a fine powder to the bicarbonate, if the latter be separate from the acids. To the compound, or to either powder, when kept separate, is added ground loaf-sugar, with the addition, if desired, of a medicinal drug—such as Epsom salts—and any flavoring compound or essence, such as oil of lemon.

I prefer to use the different ingredients in about the following proportions, though they may be somewhat varied to suit different purposes or tastes, if found desirable to do so—viz., soda bicarbonate, five hundred and twenty parts; acid tartaric, five hundred and twenty parts; cream-tartar, one hundred parts; sugar, (crushed loaf,) three hundred and eighty parts; Epsom salts, one hundred and forty parts; permanganate of potash, one part; flavoring to taste.

The acids and bicarbonate are taken or mixed together in a dry form in the usual respective quantities to effect partial neutralization when dissolved in water. To the mixed powders, or to either separately, is added the requisite quantity of sugar, and to these, when thoroughly incorporated, is added the finely-powdered permanganate of potash. The mixture is preferably warmed or heated to about 120° Fahrenheit before addition of the permanganate of potash, in order to obtain the thorough mixture and incorporation of the ingredients. Finely-ground Epsom salts or other drug intended to be used is then added; also the oil of lemon or other flavoring. When oxygenating qualities are especially required, a quantity of finely-ground chlorate of potash about equal to one hundred parts of the above mixture is added. Besides permanganate of potash or of soda, other coloring-matters can be used. Thus chlorate of potash and dimethylaniline or other intense coloring-matter can be used that can be added in the dry pulverulent form, although most of these are poisonous, yet the quantity required to produce the requisite coloring effect is so small that no baneful results follow. I, however, much prefer the permanganate of potash, it being non-poisonous.

I prefer to prepare the compound as one mixture and not in separate parts, though any one or more of the ingredients may be prepared separately and mixed or combined immediately before use.

It will be understood that while I consider the above-mentioned proportions the best, I do not limit the invention exactly to them, nor to a compound consisting of all of them; but

What I claim as my invention is—

1. The improved process of making effervescent-drink powders, which consists in adding in the dry state to and mixing intimately with any ordinary dry effervescent mixture, powdered soluble permanganate in such limited quantity that its color shall be masked by the white ingredient, whereby a colorless effervescent material is formed which on admixture with water forms a colored solution and froth.

2. As a new article of manufacture, a colorless effervescent mixture having as constituents the ordinary effervescent powder, such as is now sold in stores, and powdered alkaline permanganate, the latter in such limited quantity as to be practically masked when dry by the white effervescent powder, so that the whole has a white color, but will produce a colored drink.

3. A compound formed of sodic bicarbonate, tartaric acid, cream of tartar, sugar, Epsom salts, and permanganate of potash, substantially as and in the proportions specified.

In testimony whereof I have signed my name to this specification in the presence of two subscribing witnesses.

RICHARD CLARKSON SCOTT.

Witnesses:
 WM. P. THOMPSON,
 C. COVENTRY.